(12) United States Patent
Strong

(10) Patent No.: US 6,776,428 B2
(45) Date of Patent: Aug. 17, 2004

(54) FORWARD EXTENDING WHEEL SUSPENSION SYSTEM

(76) Inventor: Russell W. Strong, 410 S. Piskin Rd., Craftsbury Common, VT (US) 05827

( * ) Notice: Subject to any disclaimer, the term of this patent is extended or adjusted under 35 U.S.C. 154(b) by 0 days.

(21) Appl. No.: 10/173,319

(22) Filed: Jun. 17, 2002

(65) Prior Publication Data

US 2002/0190491 A1 Dec. 19, 2002

Related U.S. Application Data

(60) Provisional application No. 60/298,723, filed on Jun. 15, 2001.

(51) Int. Cl.[7] .............................. B60G 3/12; B60G 7/00; B60G 15/00
(52) U.S. Cl. ......................... 280/124.128; 280/124.153; 280/124.154; 16/18 R; 16/44
(58) Field of Search ................... 280/124.128, 124.153, 280/124.154; 16/18 R, 20, 22, 23, 38, 31 R, 31 A, 41, 18 B, 44

(56) References Cited

U.S. PATENT DOCUMENTS

| | | | |
|---|---|---|---|
| 2,770,832 A | | 11/1956 | Martin |
| 3,161,251 A | * | 12/1964 | Kraus .................. 280/124.153 |
| 3,479,049 A | | 11/1969 | Duecy |
| 3,518,714 A | | 7/1970 | Hager |
| 3,672,701 A | | 6/1972 | Blank |
| 3,817,548 A | | 6/1974 | De Puydt et al. |
| 3,924,292 A | | 12/1975 | Christensen |
| 4,043,571 A | * | 8/1977 | Guerbet ............... 280/124.153 |
| 4,076,271 A | * | 2/1978 | Doncque .................... 280/284 |
| 4,078,821 A | | 3/1978 | Kitterman |
| 4,248,445 A | | 2/1981 | Vassar |
| 4,353,567 A | | 10/1982 | Weldy |
| 4,372,569 A | | 2/1983 | Otterson |
| 4,449,725 A | | 5/1984 | Robison et al. |
| 4,506,755 A | * | 3/1985 | Tsuchida et al. ............ 280/284 |
| 4,511,155 A | | 4/1985 | Galloway |
| 4,574,909 A | * | 3/1986 | Ribi ........................... 280/284 |
| 4,645,230 A | | 2/1987 | Hammons |
| 4,685,174 A | | 8/1987 | Hager |
| 4,821,833 A | | 4/1989 | Yamaguchi |
| 4,834,412 A | | 5/1989 | Trema |
| 4,998,748 A | * | 3/1991 | Kashiwagi et al. ... 280/124.153 |
| 5,066,030 A | | 11/1991 | Brett et al. |
| 5,184,373 A | | 2/1993 | Lange |
| 5,228,522 A | | 7/1993 | Stufflebeam et al. |
| 5,590,605 A | | 1/1997 | Salter et al. |
| 5,607,030 A | | 3/1997 | Swift et al. |
| 5,785,154 A | | 7/1998 | Chen |
| 5,797,611 A | | 8/1998 | Joseph et al. |
| 6,050,008 A | | 4/2000 | Doornek et al. |
| 6,062,580 A | * | 5/2000 | Kawabe et al. ....... 280/124.154 |
| 6,070,701 A | | 6/2000 | Hu |
| 6,073,946 A | * | 6/2000 | Richardson .......... 280/124.128 |
| 6,173,978 B1 | * | 1/2001 | Wagner ............... 280/124.128 |
| 6,234,507 B1 | | 5/2001 | Dickie et al. |
| 6,357,793 B1 | * | 3/2002 | Dickie et al. ......... 280/124.128 |
| 6,568,030 B1 | * | 5/2003 | Watanabe et al. ............... 16/44 |
| 6,581,711 B1 | * | 6/2003 | Tuluie ................. 280/124.128 |

* cited by examiner

Primary Examiner—Darren W. Ark
(74) Attorney, Agent, or Firm—Artz & Artz, PC

(57) ABSTRACT

A suspension system for a vehicle includes a support structure of a wheel having a forward rolling axis. The suspension system includes a first link rotatably secured at an inner end to the vehicle and in communication with the support structure of wheel at an outer end. The suspension system includes a second link rotatably secured at an inner end to the vehicle and in communication with the support structure of the wheel at an outer end. The system also includes a shock absorber having a first end in communication with one of the first link or the second link and a second end rotatably secured to the vehicle. The shock absorber is compressible to allow the support structure of the wheel to absorb impact forces imparted thereto during travel. The shock absorber is located along a longitudinal axis of the vehicle.

12 Claims, 5 Drawing Sheets

FORWARD EXTENDING WHEEL SUSPENSION SYSTEM

CROSS-REFERENCE TO RELATED APPLICATIONS

The present invention claims priority from U.S. Provisional Application Ser. No. 60/298,723, entitled "4-Bar Linkage Suspension For A Vehicle With Longitudinal Orientation," filed Jun. 15, 2001.

TECHNICAL FIELD

The present invention relates generally to suspension systems for use with a vehicle wheel. More specifically, the present invention relates to a four bar linkage suspension system for a vehicle wheel that can be used in a variety of all terrain and high speed applications.

BACKGROUND OF THE INVENTION

Suspension systems for vehicle wheels have been developed for a variety of different configurations. These suspension systems are incorporated into a variety of different vehicles, including automobile, motorcycles and the like. Current suspension systems are typically configured such that they are located inwardly from the vehicle wheel and along the wheel's axis. Because these suspension systems are located inwardly from the vehicle wheel, they require a relatively large amount of space. These suspension systems provide satisfactory performance, however, the amount of space required to accommodate the suspension system is disadvantageous for many uses.

Other known suspension systems, such as utilized on some motorcycles allow the wheel to move up and down as an impact force is imparted to the wheel. This upward and downward movement of the vehicle wheel has no rearward component and the suspension does not provide a stationary suspension base allowing steering of the wheel relative to the suspension and no dolly wheel capability.

As is also known, dolly wheels are commonly used on vehicles or other devices which operate at low speeds (0–10 m.p.h.) as well as on industrial trucks and dollies and other equipment where it is advantageous to have zero turn capabilities. The wheels on such dolly wheel suspensions are subjected to relatively high impact forces when they engage an obstruction. These impact forces typically increase as a function of increasing speed and weight or load, and decreasing wheel radius.

Shock absorbing dolly wheel suspensions have been developed to reduce the transmission of impact forces from the ground engaging wheels to the suspension and to the load or equipment supported thereby. Many of these dolly wheel suspension systems utilize a variety of springs attached to different support members to minimize the transmission of impact forces on the dolly wheels to the vehicles. While these dolly wheel suspension systems provide satisfactory performance, that are generally utilized in a trailing fashion on the vehicle. As such, these systems do not provide a forward extending unit and, in particular, if they were placed forwardly of the vehicle, they would require space ahead of the wheel, thereby increasing the vehicle packaging size. And, if these systems were reversed to be forwardly extending as defined, they would not generate an up and back motion of the wheel, which would be most advantageous for a dolly wheel suspension.

There are also dolly wheel systems that use a short spring or elastomeric compression component to dampen impact loads. However, these systems are relatively limited in suspension travel and are restricted in achieving the travel dampening characteristics that are generally accomplished with a shock absorber.

It would thus be advantageous to provide a wheel suspension system that is forwardly extending without being ahead of the wheel while providing an up and back motion, which is advantageous to the ride performance of the vehicle. It would similarly be advantageous to provide a suspension system for a dolly wheel that requires significantly less space without sacrificing performance.

SUMMARY OF THE INVENTION

It is therefore an object of the present invention to provide a suspension system for a vehicle wheel that will effectively absorb the shocks incident to travel of the vehicle over irregular road surfaces.

It is another object of the present invention to provide a suspension system for a vehicle wheel in which the dolly wheel is mounted for generally up and down movements as it encounters irregularities in road surface and arranged with a spring and shock absorber to yieldably resist upward movement of the wheel and to absorb road shocks resulting in the minimum upward component of movement of the vehicle itself.

It is yet another object of the present invention to provide a suspension system for a vehicle wheel that can be packaged in a compact area within a vehicle.

It is a further object of the present invention to provide a suspension system for a vehicle wheel that includes the full shock absorption and spring action that is currently present in existing automotive vehicles.

It is still a further object of the present invention to provide a suspension system for a vehicle wheel that allows the vehicle wheel to move upwardly and rearwardly when subjected to an impact force on the ground.

It is still another object of the present invention to provide a suspension system that is located rearwardly of the vehicle wheel axis with respect to the direction of travel of the vehicle.

It is yet a further object of the present invention to provide a suspension system that provides the above advantages and/or objects for a dolly wheel's free rotational orientation or a fixed/steering configuration.

It is yet another object of the present invention to provide a suspension system that utilizes at least one pivoting linkage with orientation fore and aft resulting in an upwardly and rearwardly path of the wheel and suspension system for absorption of impact In accordance with the above and the other objects of the present invention, a suspension system for a vehicle is provided. The suspension system includes a vehicle wheel having a forward rolling orientation defined by the direction of travel. The system includes a first link that is pivotally secured at an inner end to the vehicle. The first link is in communication with the vehicle wheel support at an outer end. The system also includes a second link that is rotatably secured at in inner end to the vehicle. The second link is in communication with the vehicle wheel at an outer end. The system also includes a shock absorber having a first end in communication with either the first link or the second link. The shock absorber has a second end pivotally secured to the vehicle. The shock absorber is compressible to allow the vehicle wheel to absorb impact forces imparted thereto by the four bar linkage controlling the transmitting motion of the wheel while the shock absorber absorbs the load. The shock absorber is located along a forward axis of the vehicle.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
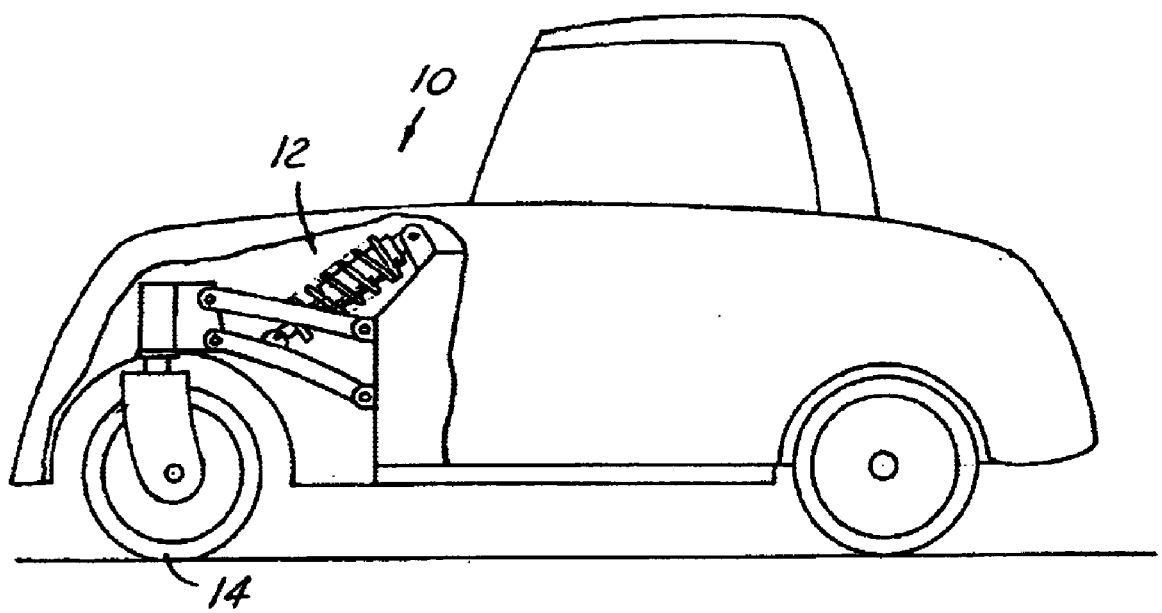
FIG. 1 is a side view of a vehicle partially broken away illustrating a vehicle wheel suspension system in accordance with a preferred embodiment of the present invention.
Figure 2:
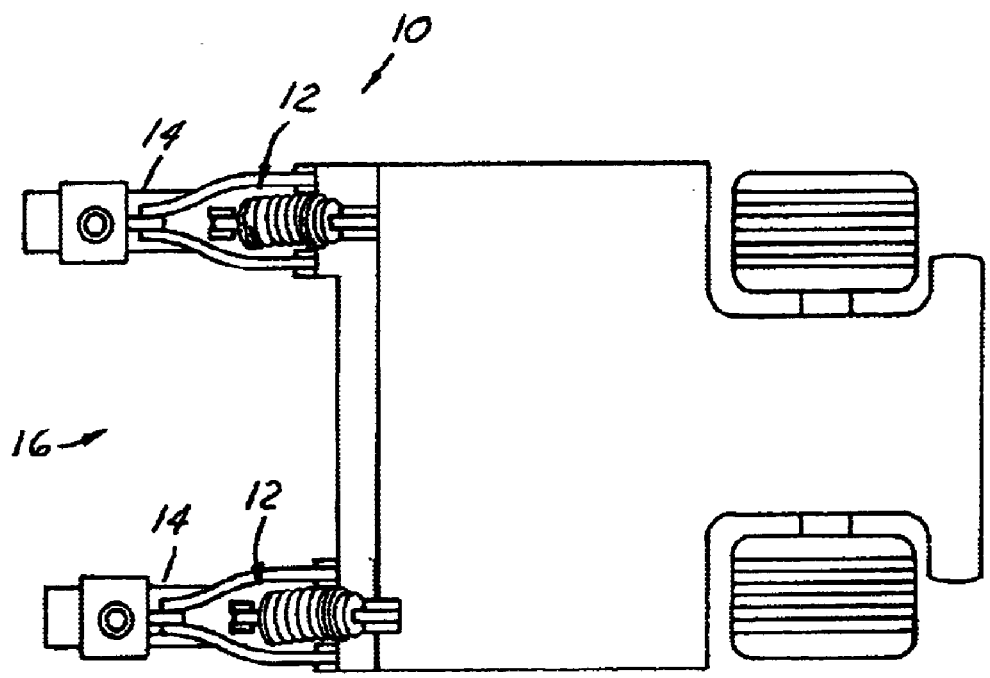
FIG. 2 is a top view of a vehicle illustrating a vehicle wheel suspension system in accordance with a preferred embodiment of the present invention.
Figure 4:
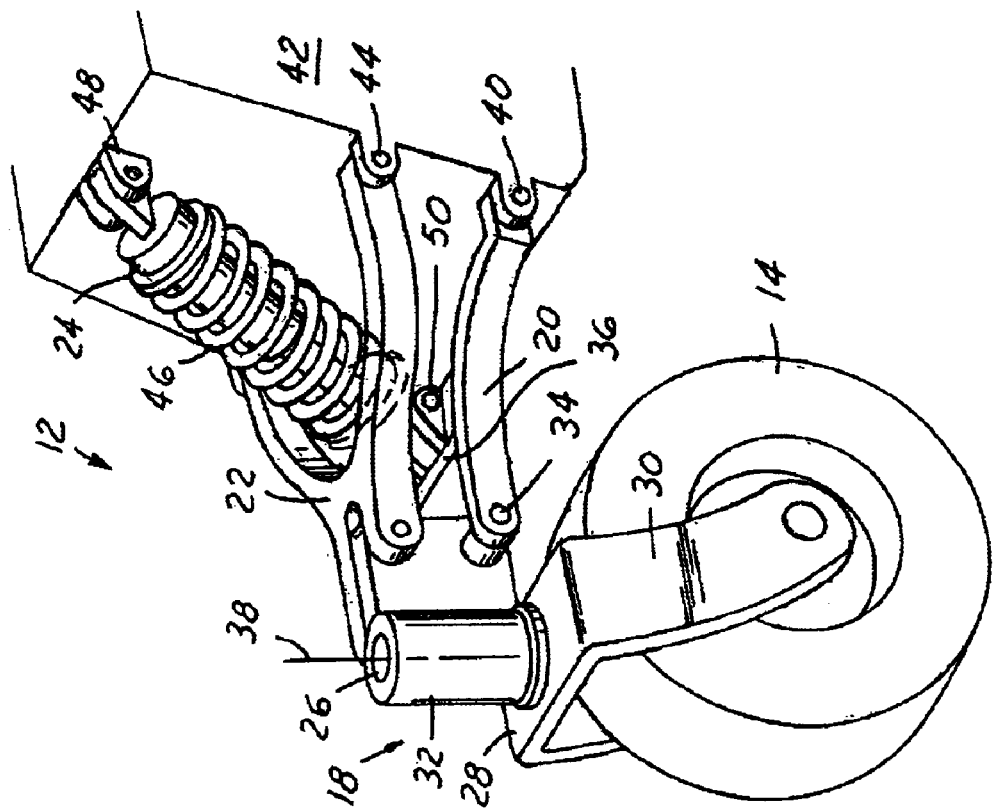
FIG. 4 is a perspective view of the dolly wheel suspension system of FIG. 3.

Referring now to FIGS. 1 and 2, which illustrates a vehicle 10 utilizing a wheel suspension system 12 in accordance with a preferred embodiment of the present invention. As will be understood, the wheel suspension system 12 is preferably intended for use with a dolly wheel that provides, what are termed in the art, zero turn capabilities. Alternatively, the system may have a fixed steering configuration, but with the ability for the wheel to turn freely forward and below the suspension system. Additionally, the disclosed suspension system is preferably incorporated into a vehicle, such as an automotive vehicle or a mobility vehicle. As shown, when incorporated into a vehicle 10, the suspension system 12 is preferably included on each of the front wheels 14. However, it will be understood that the disclosed suspension system can also be utilized on the rear wheels of a vehicle. Moreover, the preferred vehicle 10 has an open front 16.

Figure 3:
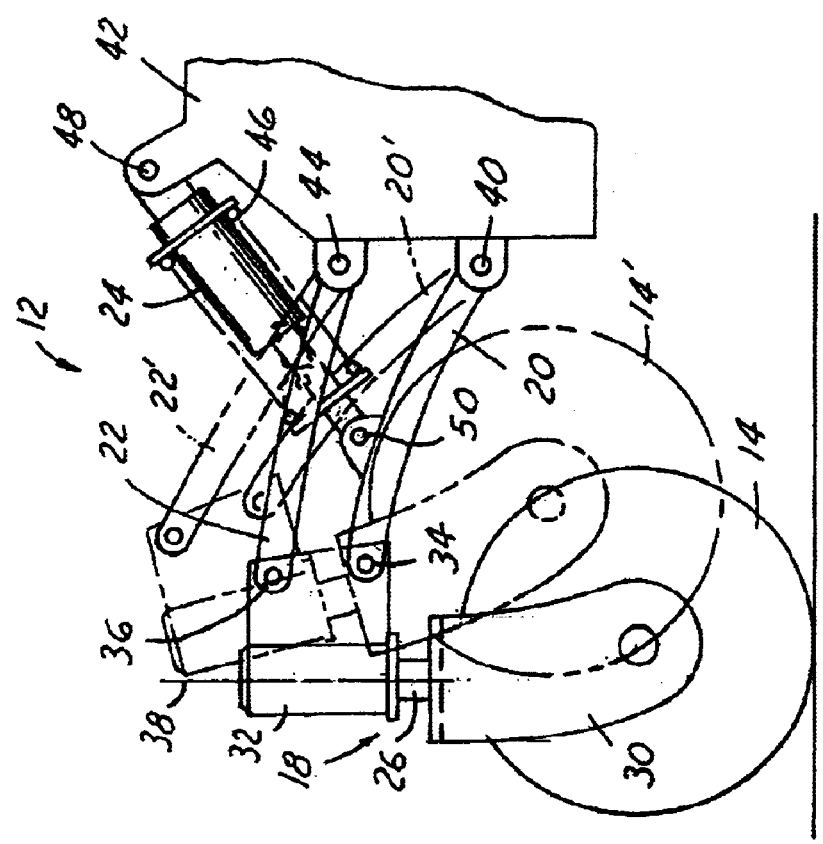
FIG. 3 is a schematic side view illustrating the operation of a vehicle wheel suspension system in accordance with a preferred embodiment of the present invention.
Figure 5:
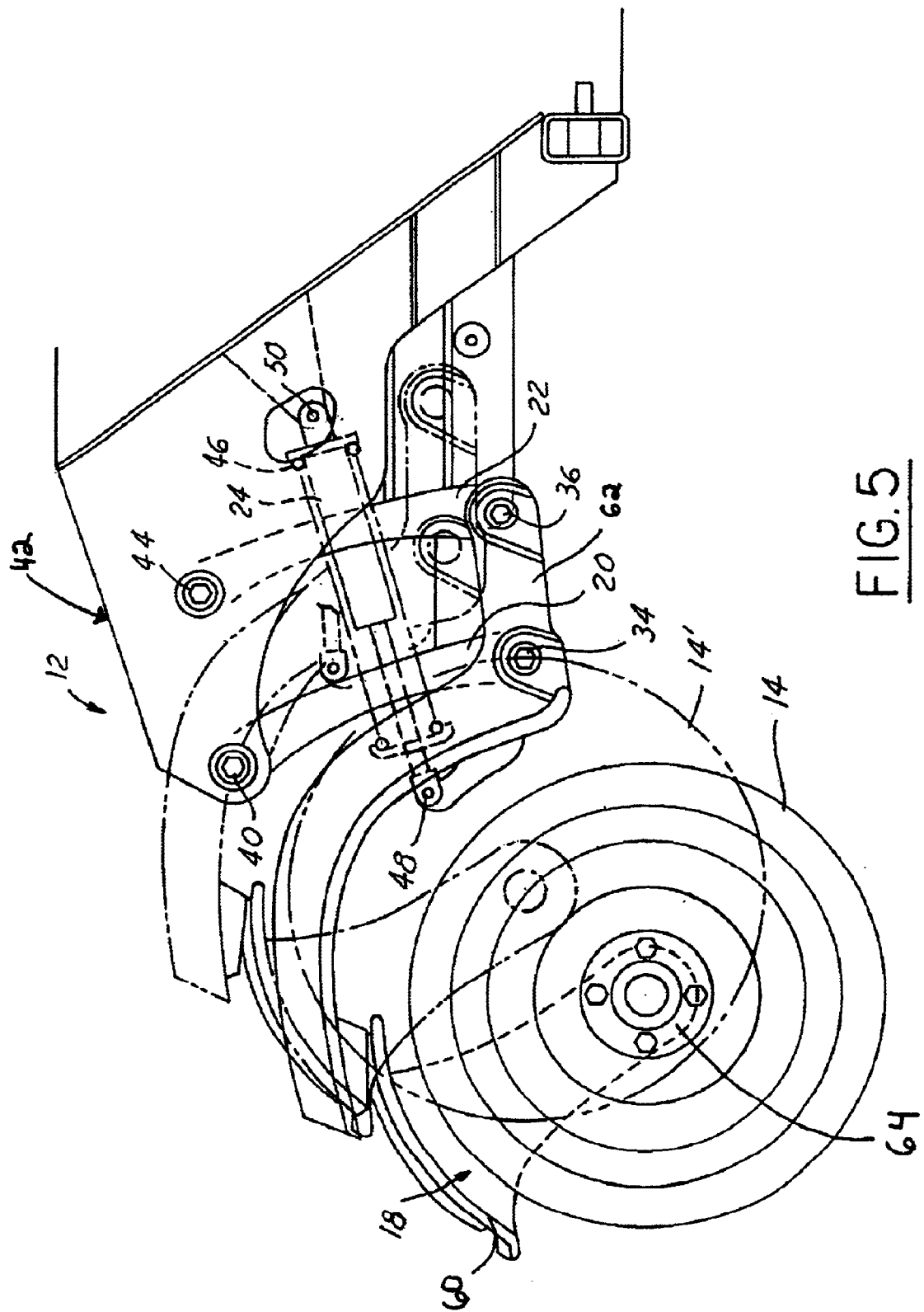
FIG. 5 is a schematic side view illustrating the operation of a vehicle wheel suspension system in accordance with another preferred embodiment of the present invention.

Referring now to FIGS. 3 and 5, which illustrate a preferred embodiment of the present invention. As shown, the wheel suspension system 12 is preferably packaged into a narrow longitudinal space that is in line with a vehicle wheel 14. The wheel suspension system 12 illustrated in FIGS. 3 and 5, is preferably utilized with a dolly wheel 14. The suspension system also includes a dolly wheel spindle assembly 18, a first linkage unit 20, a second linkage unit 22, and a shock absorber 24.

The dolly wheel spindle assembly 18 includes an upwardly extending pin portion 26, a top portion 28, and downwardly extending support portions 30. The pin portion 26 is received within a bearing housing 32 that allows the pin portion 26 to rotate within the bearing housing 32. The bearing housing 32 is pivotally secured to a first end 34 of the first linkage unit 20 and to a first end 36 of the second linkage unit 22. The pin portion 26 is fixedly secured or integrally formed with the top portion 28, which extends over top of the wheel 14. The downwardly extending support portions 30 are intended to engage the wheel 14 by an axle or pin, which passes through the center of the wheel 14. By this configuration, movement of the dolly wheel spindle assembly 18 effectuates movement of the dolly wheel 14. Moreover, the dolly wheel spindle assembly is thus free to spin about a dolly wheel spindle axis 38 to respond to the direction of travel of a vehicle.

The first linkage unit 20 has a second end 40, which is pivotally secured to a frame portion 42 of the vehicle 10. The second linkage unit 22 has a second end 44, which is pivotally secured to the frame portion 42 of the vehicle 10. The first linkage unit 20 and the second linkage unit 22 together form a four bar linkage system. In this orientation, that first linkage unit 20 and the second linkage unit 22 are preferably oriented in a generally horizontal direction, with respect to the ground and the direction of travel of the vehicle 10. The four-bar linkage suspension system is preferably oriented in line with the vehicle wheel 14, i.e., behind the vehicle wheel 14 with respect to the direction of travel. This is contrary to normal suspension orientations where the components of the suspension are oriented generally in line with the axis of the wheel, i.e., inwardly from the vehicle wheel and generally in line with its centerline.

The shock absorber 24 is preferably a spring shock and includes a spring 46. The shock absorber 24 has an outer end 50 that is pivotally secured to first linkage unit 20 and an inner end 48 that is pivotally secured to the frame portion 42 of the vehicle. The shock absorber 24 is preferably set for operating load and acts in compression. As will be understood, the shock absorber 24 thus urges the first linkage unit 20 and thus the dolly wheel spindle assembly 18 downwardly such that the dolly wheel 14 engages the ground.

In accordance with the disclosed invention, the linkage members 20, 22 and their general axis of movement are located behind the wheel 14 in the normal direction of travel. The linkages 20, 22 are constructed with suspension movement to allow clearance for wheel movement. To effectuate clearance, the first linkage unit 20 preferably has a curved configuration to minimize interference with the wheel 14, when the wheel 14 is pivoted, as shown in FIG. 3.

As shown in the figures, the suspension system 12 is preferably oriented in line with the wheel 14 with its components accommodated within the width of the wheel 14 and the support linkages 20, 22. The orientation of the support linkages 20, 22 and their lengths is intended to provide "up and back" motion of the wheel 14 to better absorb forward impact, bumps, or obstructions. The system also provides free rotation of the wheel and spindle, with clearance for the wheel to be used in a "dolly wheel" configuration. This "up and back" motion is shown best in FIG. 3.

In operation, when the wheel 14 is subjected to a force, such as through a bump or rock, the wheel 14 moves as defined by the connection of the first ends 34, 36 of the first and second linkages 20, 22 and the connection of their second ends 40, 42 such that the linkages 20, 22 move upward and by the result of the 4 bar linkage, allow the wheel 14 to move backward. At the same time, the shock absorber 24 compresses and pivots about its inner end 48 and its outer end 50. The wheel is thus positioned as indicated by reference number 14' and the linkages are generally indicated by reference numbers 20', 22'.

Figure 6:
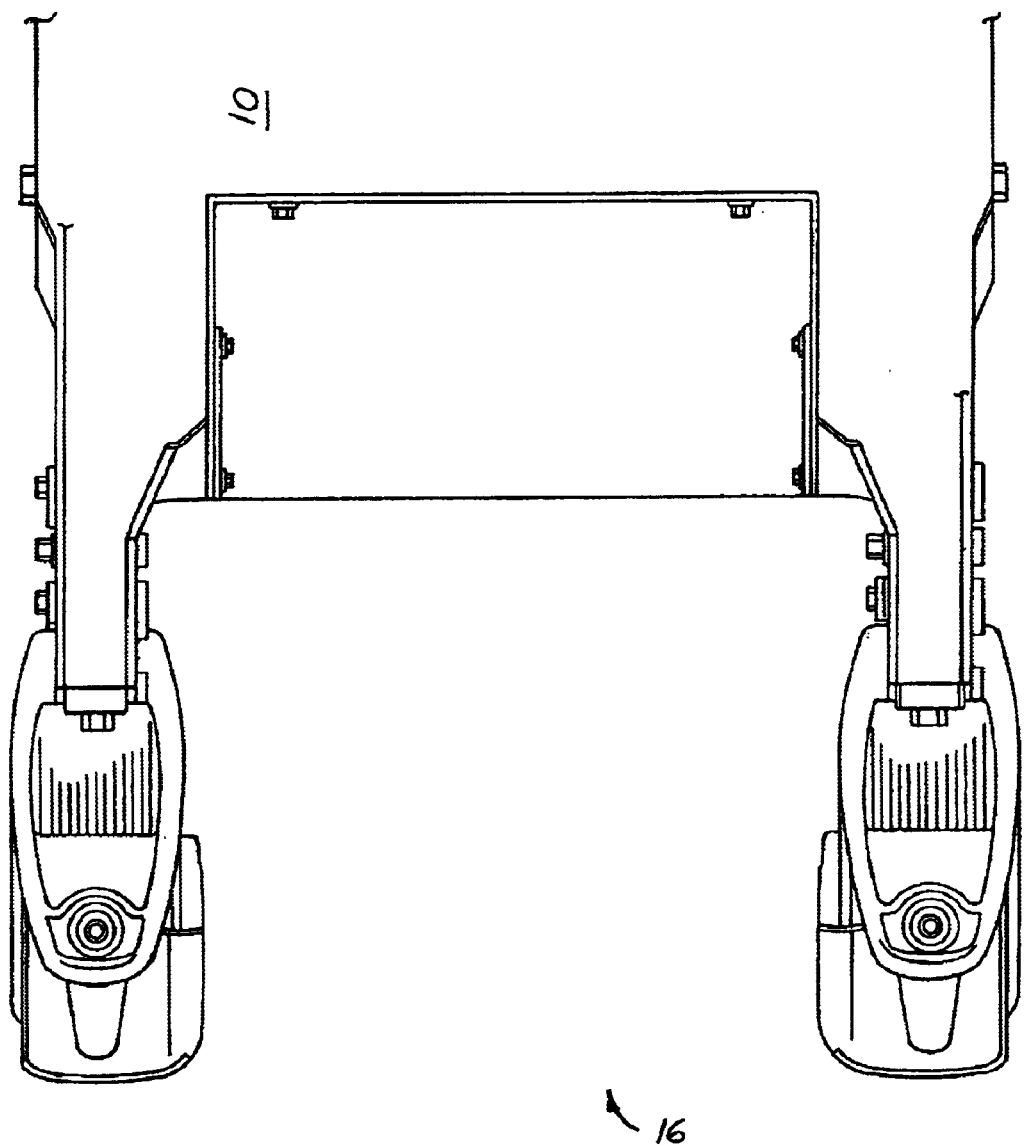
FIG. 6 is a top view of a vehicle employing a vehicle wheel suspension system in accordance with another preferred embodiment of the present invention.
Figure 7:
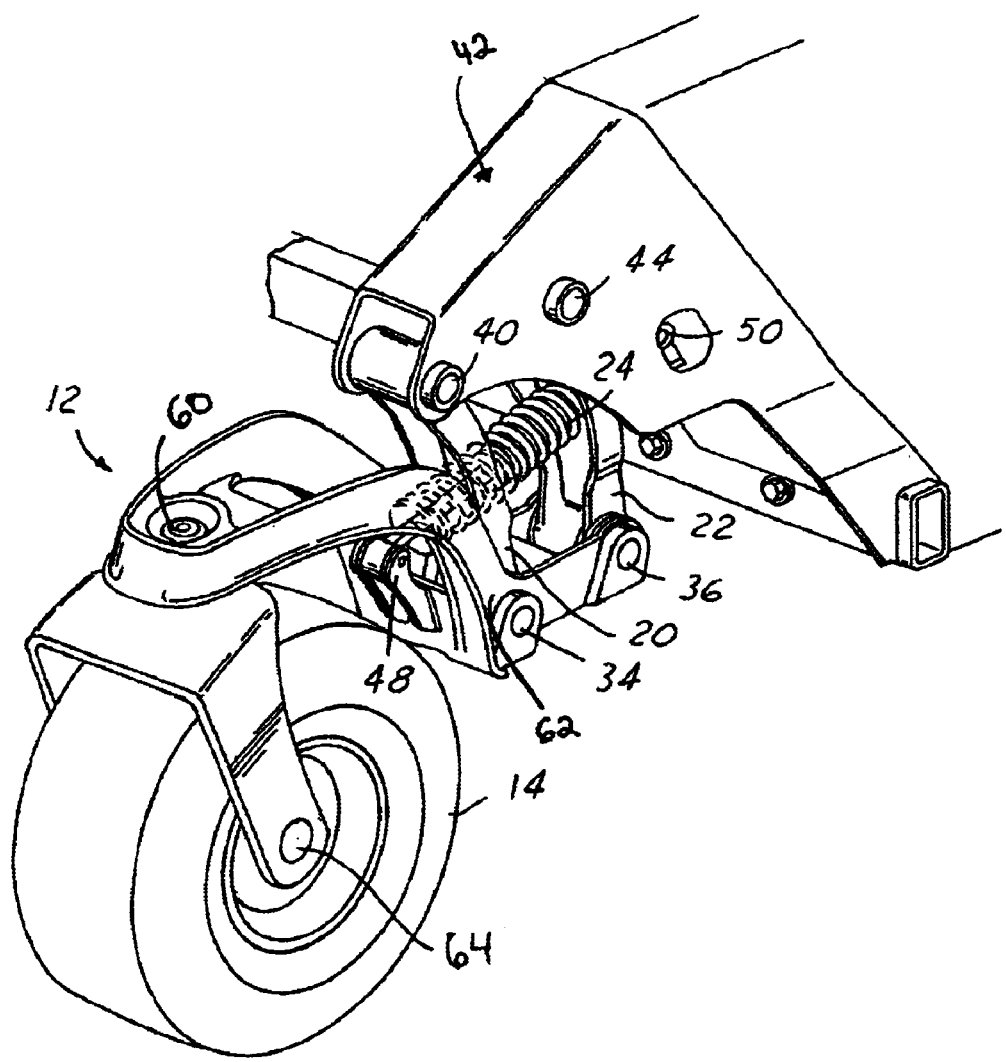
FIG. 7 is a perspective view of a vehicle wheel suspension system in accordance with another preferred embodiment of the present invention.

Referring now to FIGS. 5 through 7, which illustrate another embodiment of a suspension system 12 in accordance with the present invention. The wheel suspension system 12 in this embodiment is also preferably packaged into a narrow longitudinal space that is in line with the vehicle wheel 14. The wheel suspension system 12 in this embodiment is also preferably utilized with a dolly wheel 14. However, as will be understood it can be utilized in connection with a variety of other wheels. The suspension system 12 includes a dolly wheel spindle assembly 18, a first linkage unit 20, a second linkage unit 22, and a shock absorber 24.

The dolly wheel spindle assembly 18 is secured at an upper end 60 to a wheel carrier portion 62 and at a lower end 64 to the wheel 14. The wheel carrier portion 62 is pivotally secured to the frame portion 42. The first end 34 of the first linkage 20 is pivotally secured to the wheel carrier portion 62. The first end 36 of the second linkage 22 is pivotally secured to the wheel carrier portion 62. The second end 40 of the first linkage 20 is pivotally secured to the frame portion 42. The second end 44 of the second linkage 22 is pivotally secured to the frame portion 42.

The first linkage unit 20 and the second linkage unit 22 together form a four bar linkage system. In this orientation, the first linkage unit 20 and the second linkage unit 22 are preferably oriented in a generally vertical and direction, with respect to the ground and the direction of travel of the vehicle 10. The four-bar linkage suspension system is preferably oriented in line with the vehicle wheel 14, i.e., behind the vehicle wheel 14 with respect to the direction of travel. The shock absorber 24 is connected at its outer end 50 to the wheel carrier frame 62 and at its inner end 52 to the vehicle frame 42.

In operation, when the wheel 14 is subjected to an impact force, such as through a bump or rock, the wheel 14 moves as defined by the connection of the first ends 34, 36 of the first and second linkages 20, 22 and the connection of their second ends 40, 42 such that the linkages 20, 22 move as a result of the 4-bar linkage to allow the wheel 14 to move backward and upward. At the same time, the shock absorber 24 compresses and pivots about its upper end 48 and its lower end 50.

The preferred vehicle configuration provides for an open area 16 between the wheels 14 such that the area can be used for entry and exit of the vehicle or as a lifting area for other devices. This also allows good suspension travel in a small package and the geometry allows a high component of rear motion of the tire for better fore-aft shock absorption.

While a preferred embodiment of the present invention has been described so as to enable one skilled in the art to practice the present invention, it is to be understood that variations and modifications may be employed without departing from the purview and intent of the present invention, as defined in the following claims. Accordingly, the preceding description is intended to be exemplary and should not be used to limit the scope of the invention. The scope of the invention should be determined only by reference to the following claims.

What is claimed is:

1. A suspension system for a vehicle, comprising:
 a vehicle wheel;
 a support structure of said wheel having a forward rolling axis and an axis of rotation;
 a first link rotatably securable at a first end to a vehicle and in communication with said support structure of the wheel at a second end at a location above said wheel;
 a second link rotatably securable at a first end to said vehicle and in communication with said support structure of the wheel at a second end at a location above said wheel; and
 a shock absorber having a first end in communication with one of said first link or said second link, and a second end rotatably securable to the vehicle, said shock absorber being compressible to allow the support structure of the wheel to absorb impact forces imparted thereto during travel, said second end of said shock absorber remaining above said first end of said shock absorber at all time during operation of the vehicle;
 wherein said shock absorber has a longitudinal axis that is in line with said vehicle wheel to allow said wheel to pivot upwardly and rearwardly.

2. A wheel system for a vehicle, comprising:
 a vehicle wheel being a dolly wheel having zero turn capabilities;
 a support structure of said wheel having a forward rolling axis and an axis of rotation;
 a first link rotatably securable at a first end to said vehicle and secured to said support structure of said wheel at a second end, said first link extending forwardly from said vehicle to said support structure;
 a second link rotatably securable at a first end to said vehicle and connected to said support structure of said wheel at a second end, said second link extending forwardly from said vehicle to said support structure; and
 a shock absorber having a first end in communication with one of said first link or said second link, and a second end rotatably securable to the vehicle, said shock absorber being compressible to allow the support structure of the wheel to absorb impact forces imparted thereto during travel, said second end of said shock absorber remaining above said first end of said shock absorber at all time during operation of the vehicle;
 wherein said shock absorber is located in a same plane as said vehicle wheel.

3. A suspension system for a vehicle, comprising:
- a vehicle wheel being a dolly wheel having zero turn capabilities;
- a support structure of said wheel having a forward rolling axis;
- a first link rotatably securable at a first end to said vehicle and in communication with said support structure of the wheel at a second end;
- a second link rotatably securable at a first end to said vehicle and in communication with said support structure of the wheel at a second end; and
- a shock absorber having a first end in communication with one of said first link or said second link, and a second end rotatably securable to the vehicle, said shock absorber being compressible to allow the support structure of the wheel to absorb impact forces imparted thereto during travel, said second end of said shock absorber remaining above said first end of said shock absorber at all time during operation of the vehicle;
- wherein said shock absorber has a longitudinal axis that is in line with said vehicle wheel.

4. The system of claim 3, wherein said shock absorber is rotatably secured at said first end to said first link.

5. The system of claim 3, wherein said wheel can move upwardly and rearwardly when subjected to an impact force.

6. The system of claim 3, wherein said dolly wheel is incorporable into a vehicle having an open front.

7. The system of claim 3, wherein said first link and said second link together form a four bar linkage system.

8. The system of claim 7, wherein said first link and said second link are oriented generally longitudinal and swing in the general plane of the direction of travel of the vehicle.

9. The system of claim 8, wherein said first link has a generally curved configuration to allow for clearance as said wheel is pivoted upwardly and rearwardly.

10. The system of claim 7, wherein said first link and said second link are oriented generally vertical and swing in the general plane of the direction of travel of the vehicle.

11. The system of claim 3, wherein said support structure is a dolly wheel spindle assembly.

12. The system of claim 3, wherein said support structure is a wheel frame portion.

* * * * *